Figure 1:
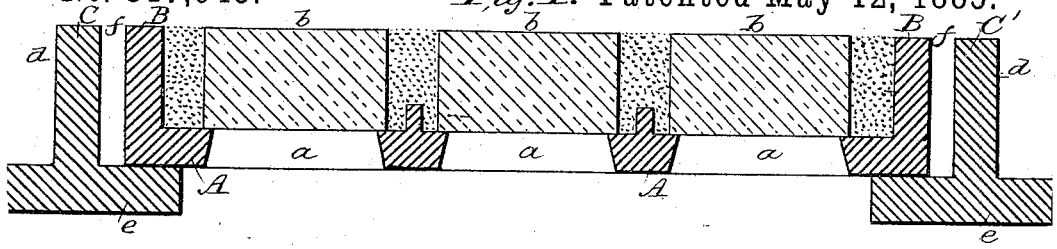

(No Model.)  2 Sheets—Sheet 1.

T. HYATT.
ILLUMINATING TILE CONSTRUCTION.

No. 317,943. Patented May 12, 1885.

Witnesses:

Inventor:
Thaddeus Hyatt

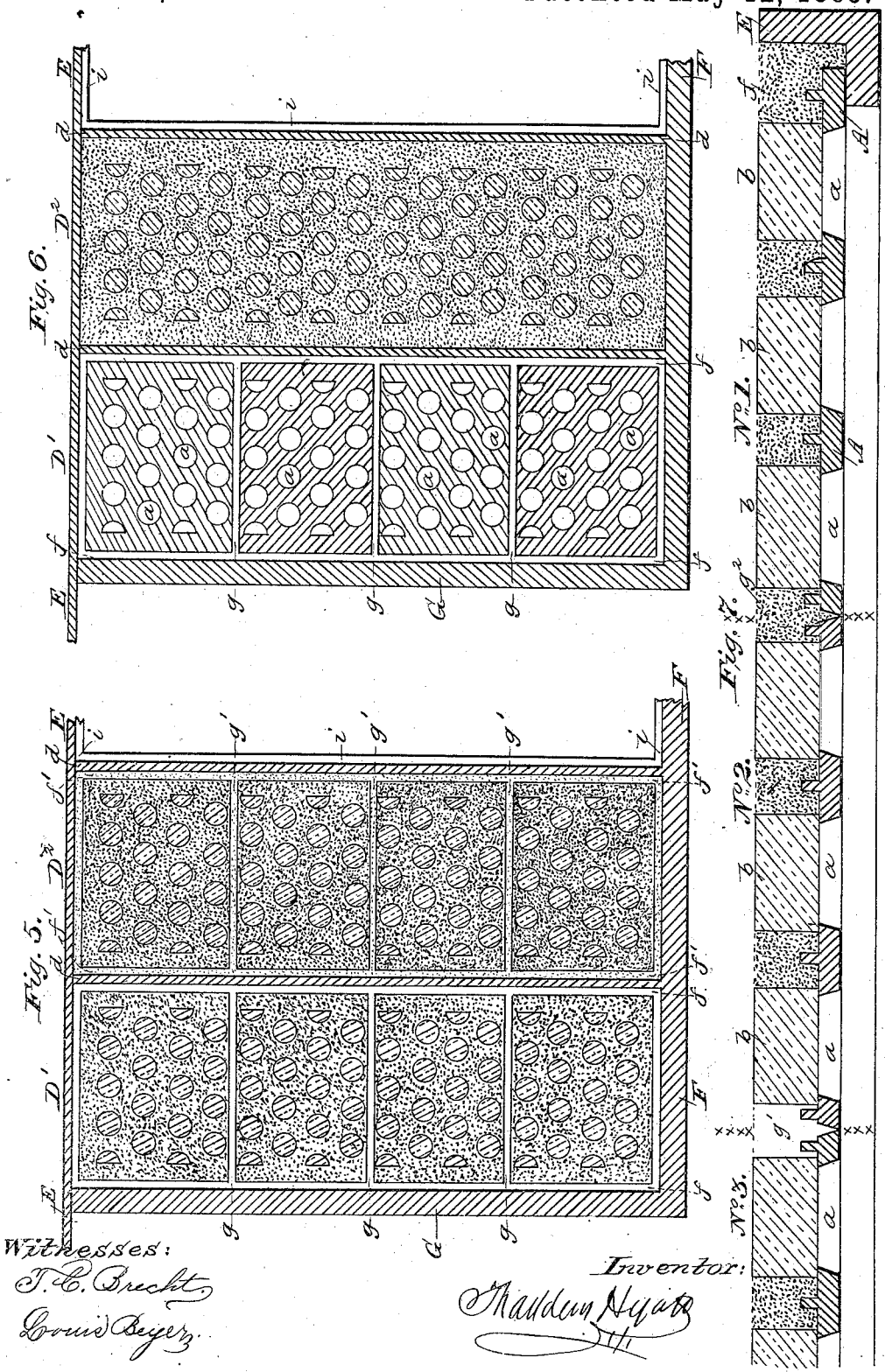

UNITED STATES PATENT OFFICE.

THADDEUS HYATT, OF BROOKLYN, NEW YORK.

ILLUMINATING-TILE CONSTRUCTION.

SPECIFICATION forming part of Letters Patent No. 317,943, dated May 12, 1885.

Application filed April 6, 1885. (No model.)

*To all whom it may concern:*

Be it known that I, THADDEUS HYATT, a citizen of the United States, residing at Brooklyn, in the county of Kings and State of New York, have invented certain new and useful Improvements in Illuminating-Tile Constructions, of which the following is a specification, reference being had to the accompanying drawings.

My present invention relates more especially to that class of illuminating-tile constructions known as "concrete lights," in which the walking or weather surface of the tile between the glasses consists of hardened hydraulic cement overlaid while in a plastic state on the underlying grating.

My improvement applies to this class of illuminating-tiling, whether made in what is known as the "one-casting" panel tile system, wherein each panel-space is filled with a grating cast in one piece, or whether made in what is known as the "fractional" system, such as is shown and claimed in my former application, No. 159,202, filed 17th March, 1885, patented April 7, 1885, No. 315,412, wherein the panel is filled with fractional gratings, junctioned directly together to form the complete tile, and made without dead-work borders on their junction sides.

Heretofore in concrete tiling, particularly in the one-casting tile system, the grating or tile has been made like a dish, or with a rising rim around its border to hold and confine the plastic cement, which rimmed grating or tile has been then fitted within the surrounding rim of the panel-space of the foundation-frame, and filled with cement flush with the tops of the glasses, and the construction seam or crevice between the rimmed grating or tile and the rim of the panel-frame is also filled with cement to make a water-tight joint, such gratings or tiles being held to the foundation-frame by bolting or other mechanical means.

In my former fractional system referred to, I showed the fractional gratings as faced with hardened hydraulic cement before they were placed in the panel-frame to form the tile. Now in my present improvement I omit the raised marginal rim on the tile, (whether in the one-casting panel or fractional-panel system,) and these tiles are first fitted naked into the rimmed panel-frame, the glasses being placed in the light-holes either before or after the gratings are laid in place, and the whole is then overlaid with plastic hydraulic cement flush with the rim of the panel. Hence by this means the cement is carried in a homogeneous manner over the joints between the tile and the panel-rim and over the joints between the fractions of the grating, if made in fractions, and these joints are thus not only concealed and rendered water-tight, but the tile is secured more firmly in the panel, and the sections thereof bound together, and the glasses are secured in the grating, and a weather and walking surface of uniform appearance produced throughout the panel, which results are all effected at the one action in filling the panel with the plastic cement, thereby presenting most desirable advantages.

My invention therefore consists in the features above outlined, as hereinafter fully set forth.

Figure 2:
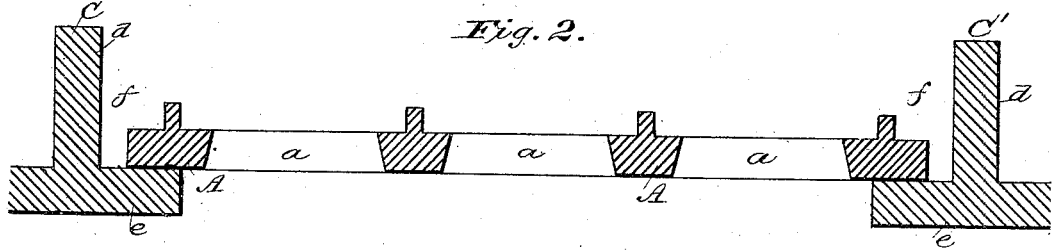
Figure 3:
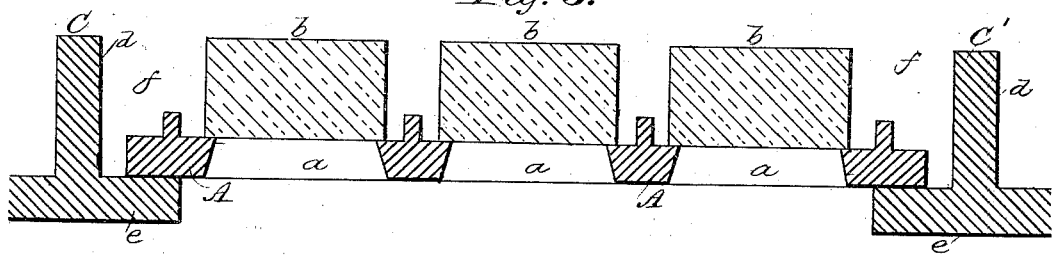
Figure 4:
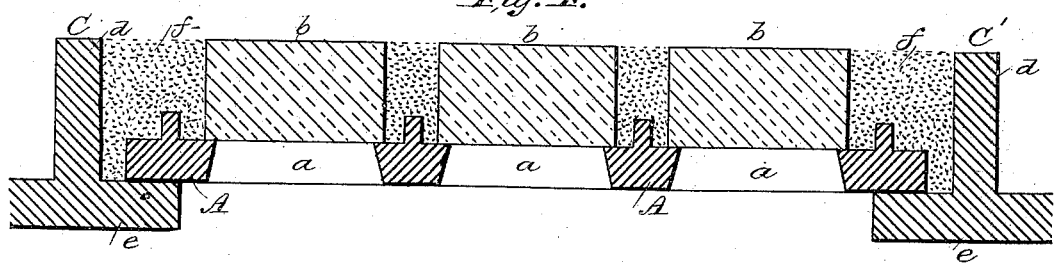

In the drawings annexed, Figure 1 presents a cross-section of a panel filled with a rimmed cemented grating according to the old system. Fig. 2 is a similar section showing my improved unrimmed grating set into the panel previous to the insertion of the glasses and the application of the cement. Fig. 3 is the same as Fig. 2 with the glasses inserted in the light-holes of the grating. Fig. 4 is a similar section showing the work finished by the flooding or spreading of the plastic cement over the naked unrimmed grating between the glasses and flush with the rim of the panel-frame. Fig. 5 is a plan view of two panels filled with fractional gratings which were concreted before being placed in the panel. Fig. 6 is a similar plan view showing my improved construction. Fig. 7 is a longitudinal section of a panel filled with fractional gratings made and concreted according to my present improvement.

In the ordinary method of manufacture, as before stated, the grating or tile is made in the form of a dish—that is to say, the tile or perforated plate is cast with sides or a standing rim around its edges, so as to hold the plastic cement when poured or put upon the face of the tile. This device was made originally in concrete lights, when as yet the article was designed merely to cover coal-holes in the sidewalk as a "vault-cover," and for this purpose possessed a decided utility, inasmuch as the peripheral rim encircling the concrete gave protection to its edges and prevented spalling, vault-covers being liable to rough usage in constant handling; but made in the form of tiling for construction purposes, the same reasons for the existence of this rim around the grating do not exist, especially when the concrete is added to the face of the gratings after they have been put into the panel-spaces of the foundation-frame or structural frame-work.

When concrete illuminating-surfaces are composed of combination-tiles made of fractional gratings that have been concreted and hardened before being placed within the panel-spaces of the structural frame-work, such gratings present a different shade of color from that of the fresh cement employed to join them together at the joint-seams and to confine them to the foundation-frame at the construction-seams, the new cement being always of a lighter color than the old. The consequence of this is very serious to this sort of work, for every such line or streak of light-colored cement on the face of the work betrays the union of the parts at those spots, and thus ruins the primary design of the fractional-gratings construction—to wit, a homogeneous surface in appearance the equal of constructions composed of one-casting tiles.

Referring to the drawings, Fig. 1 is an elevation in cross-section, representing a dish concrete light of ordinary construction made in tile form and placed between two rafters or cross-bars within the panel-space of a foundation-frame. A A is the grating or bottom of the dish; B B, the sides or standing rim of the dish; $a\,a$, light-holes of the grating; $b\,b$, glasses; C C', rafters or cross-bars of the structural frame-work; $d\,d$, web or blade of the cross-bars or rafters; $e\,e$, bottom flange of cross-bars.

Fig. 5 represents a portion of an illuminating surface or construction made of fractional gratings that have been concreted before being placed within the panel-spaces of a foundation-frame. Panel-space D' represents the fractions in position before the joint and construction seams have been filled with cement. Panel-space $D^2$ represents the same after the cement-seams have been made. $f\,f$ indicate construction-seams; $f'\,f'$, same cemented; $g\,g$, joint-seams; $g'\,g'$, same cemented. The stippling indicates concrete. E indicates the border or margin of the foundation-frame at the rear; F, the border of the same at the front; G, the left-hand border at the side of the foundation-frame; $i\,i$, rabbet in foundation-frame panel-spaces for seating the tiles or gratings.

Fig. 6 represents my improved process of making concreted fractional-grating construction-surfaces. Panel-space D' represents four naked fractional gratings with open light-holes, being neither concreted nor set with glasses. Panel-space $D^2$ represents a combination-tile formed of four fractional gratings, as shown in D', after the light-holes of the same have been closed by glasses, and the entire surface between the glasses and over the joint-seams and construction-seams have been filled in with the concrete facing.

Fig. 7 is an elevation representing in longitudinal section an enlarged view showing two fractional tiles between the $x\,x\,x$ vertical lines; and a portion of a third, numbered, respectively, Nos. 1, 2, 3—$g'$ representing a joint-seam between two fractions before the cement is put in, and $g^2$ representing a joint-seam when closed by cement or concrete.

The nature and value of my improvement with reference to the first part of my invention, or that relating to dish-shaped illuminating concrete gratings is plainly seen by reference to Figs. 1, 2, 3, 4, and by comparing the dish-formed grating shown in Fig. 1 with the more simple and inexpensive form shown by Figs. 2, 3, 4.

A comparison of the construction-seam of Fig. 4 with that of Fig. 1 shows that the concrete, as employed in the mode of construction illustrated by Fig. 4, is capable, when the sides of the dish are removed, as illustrated by Figs. 2, 3, 4, of performing the triple function of fastening the glasses in position, securing a water-tight joint at the construction-seam, and likewise cementing by a direct cementation the whole facing of concrete as well to the sides of the rafters or cross-bars as to the flat face of the perforated plate or grating underneath it, thus producing an immediate, direct, and permanent bond between the stone face of the grating and the structural foundation of the work, and converting what is ordinarily only a water-proof construction-seam between otherwise detached and independent portions of the structure into an integral and homogeneous portion of the actual structural foundation of the work.

Viewed mechanically and aside from the saving effected in the iron portion of the work, the improvement is an exceedingly advantageous one in the light of mere constructional policy.

When we compare Fig. 2 with Fig. 1, it is plain to be seen that the cavity contained between the standing-blades C C' of the cross-bars of the structural foundation, taken in connection with the flat grating A A, which rests upon the bottom flanges $e\,e$, is equal for all practical purposes to that of the cavity between the sides B B of the dish-grating A, Fig. 1, and in addition thereto possesses all the advantages above enumerated.

The great value of the new method of construction by direct combination of naked or open-hole gratings with the structural frame-work of illuminating constructions by means of plastic cement applied to the combination, becomes more conspicuously manifest when we come to constructions made of fractional gratings and combination-tiles, for when the fractions are set with glasses and concreted as articles of manufacture separate and distinct from the structural foundation that is to contain them, we have all the striking defects of surface disfigurement seen in Fig. 5, where the dark concreted face of the fractions that compose the combination-tile within the panel-space $D^2$ is seen in striking contrast with the lighter cement lines $f'f'$ and $g'g'$ that mark and indicate both the construction-seams and joint-seams of the work; and when, now, we compare this mode of construction with the improved mode herein set forth, by contrasting the combination-tile of $D^2$, Fig. 5, with that of $D^2$, Fig. 6, we perceive without argument the value of the new method; for whereas in the one case the whole face of the work is disfigured by lines which betray the piece-work nature of the construction, we have in the other a complete and homogeneous overlayer that not only covers and conceals and makes water-tight and perfect all the joint and construction seams, but at the same time presents a level, smooth, and uniform surface, both in color and quality, over the whole face of the tile.

What I claim as my invention is—

1. In illuminating-tile constructions, the combination, with a panel frame or casement having an inclosing rising rim or border, of a tile-grating made without a rising rim or border set into said panel-frame and therein overlaid or filled with plastic cement flush with the level of the glasses and the panel-frame, substantially as and for the purpose herein set forth and illustrated.

2. In illuminating-tile constructions, the combination, with a panel-frame having an inclosing marginal rim or border, of a tile-grating let into said panel without a rising rim or border, set with glasses, and finally overlaid or filled with plastic cement around and between the glasses and flush with the panel-frame, whereby the glasses are fixed in the grating and the grating fixed in the panel and a uniform cemented surface produced in the panel at one and the same action, substantially as herein set forth and illustrated.

3. In illuminating-tile constructions, the combination, with an inclosing-panel casement or frame having a rising rim or border, of fractional-tile gratings adapted to be set with glasses made without rising rims, set into said panels and junctioned directly together and overlaid or filled with plastic cement flush with the level of the glasses and panel-frame, whereby the fractions are fixed to each other and to the frame in a homogeneous manner at one action, substantially as and for the purposes herein set forth and illustrated.

4. In illuminating-tile constructions, the combination, with a panel-frame having an inclosing rim or border, of tile-gratings made in fractional sections junctioned together in said panel-frame, set with glasses, and finally overlaid or filled with plastic cement around said glasses and flush with the panel-frame, or nearly so, whereby the glasses are fixed in the gratings, the fractions of the tile are secured to each other and to the panel-frame by the same mass of cement at one action and a uniform cement surface produced in the panel, substantially as set forth.

5. In illuminating concreted tile constructions, fractional gratings placed naked in the panel-spaces, adapted to be set with glasses and finally overlaid with plastic cement flush with the panel-frame, whereby the fractions are secured together and all the joints of the panel are covered and a homogeneous or uniform concrete surface is obtained at one cementing action, substantially as set forth.

6. In illuminating concreted constructions, fractional gratings placed naked in the panel-spaces, set with glasses, and finally overlaid with plastic cement flush with the glasses and panel-frame, substantially as and for the purposes set forth.

In testimony whereof I affix my signature in presence of two witnesses.

THADDEUS HYATT.

Witnesses:
LOUIS BEYER,
JOHN C. PARKER.